May 22, 1962 A. J. LEWUS 3,036,255
CAPACITOR MOTORS
Filed March 26, 1959 2 Sheets-Sheet 1
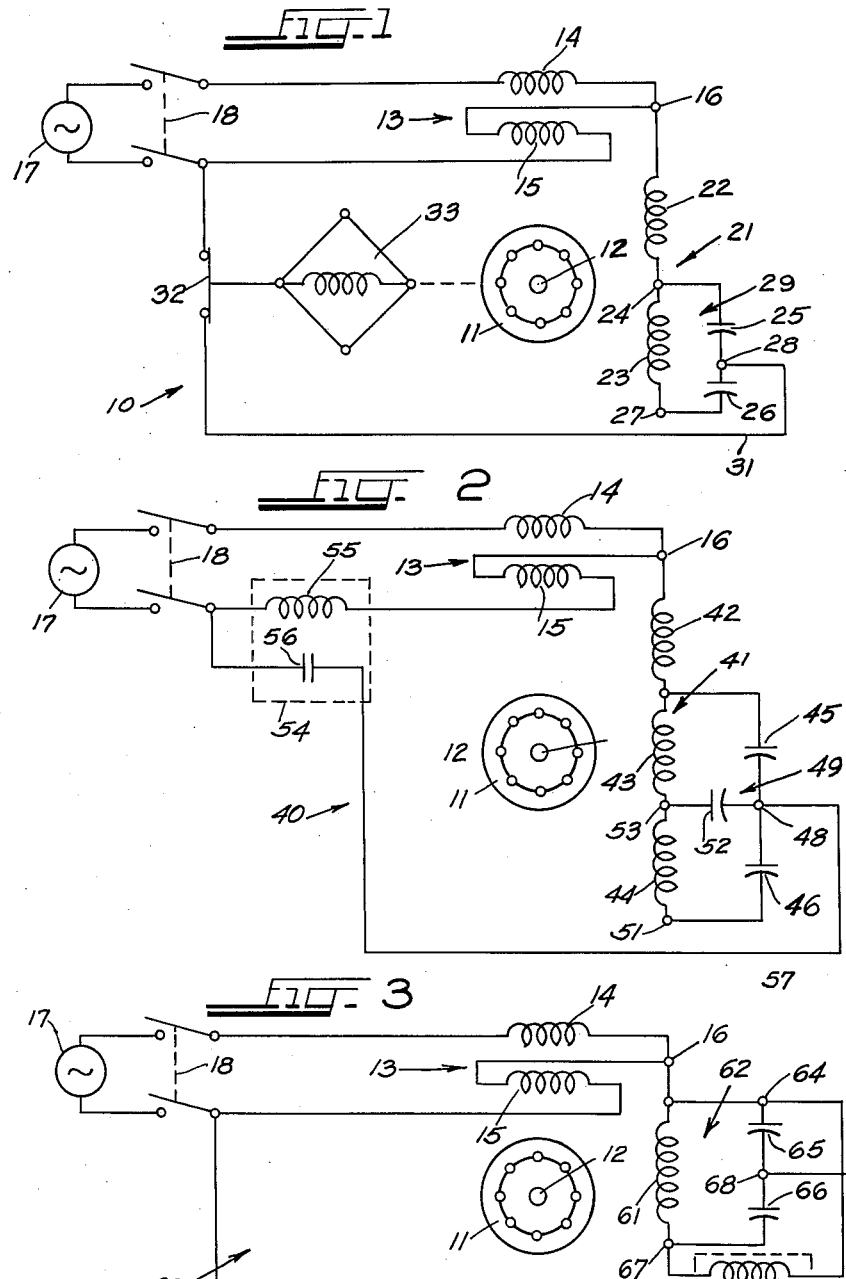
INVENTOR.
ALEXANDER J. LEWUS
BY
Wallace and Cannon
ATTYS.

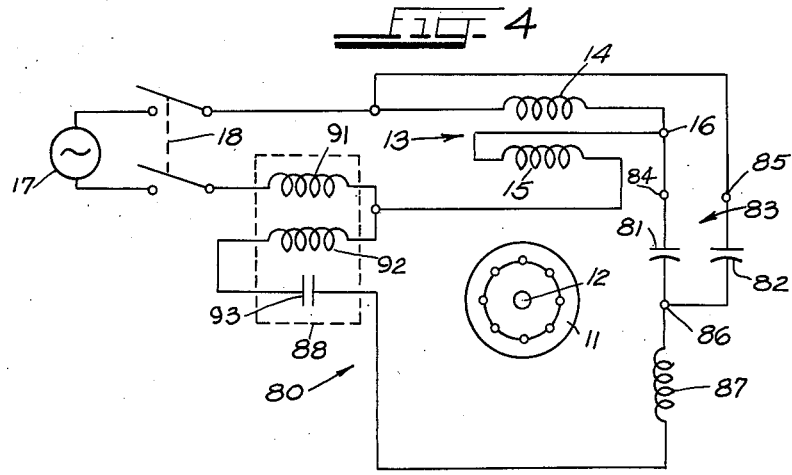
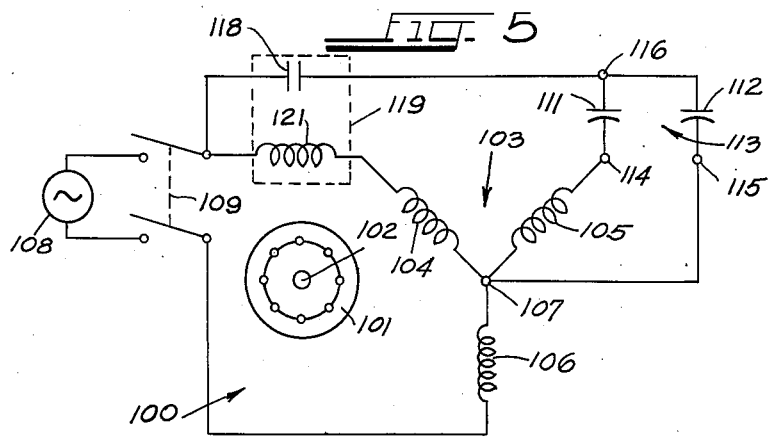
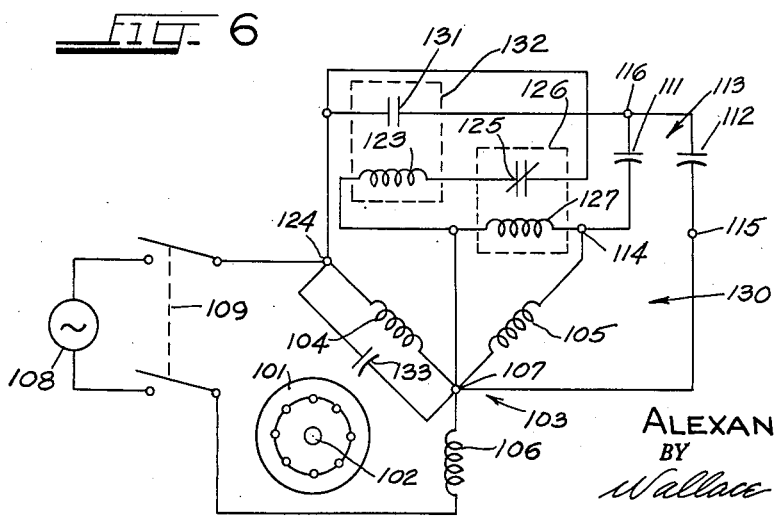

United States Patent Office 3,036,255
Patented May 22, 1962

3,036,255
CAPACITOR MOTORS
Alexander J. Lewus, 1617 S. 47th Court, Cicero 50, Ill.
Filed Mar. 26, 1959, Ser. No. 802,169
11 Claims. (Cl. 318—221)

This invention relates to single-phase capacitor-type motors, including both capacitor-start and capacitor-start capacitor-run motors, and particularly to the operating or control circuits for motors of this kind.

There are two well known kinds of single-phase induction motors which utilize capacitors as an important part of the operating circuit of the motor. One of these is conventionally referred to as a capacitor-start motor. Motors of this kind employ a main winding and an auxiliary winding, usually referred to as the starting winding, with a capacitor connected in series with the starting winding. The capacitor size is usually selected to provide, in conjunction with the starting winding, a leading current which is approximately equal to and approximately 90° displaced in phase from the lagging current in the main winding of the motor. This arrangement produces higher value of starting torque, with lower starting current, than may be obtained with any other kinds of split-phase motors.

Because of the relatively high cost of conventional foil-paper oil-immersed capacitors, the condensers employed for capacitor-start motors are usually of the intermittent-duty electrolytic type. Another factor which favors the use of this kind of capacitor for starting duty is the relatively large size of oil immersed capacitors in comparison with electrolytic capacitors. The electrolytic capacitors, on the other hand, are not capable of continuous duty operation. In many applications, however, they are quite satisfactory, since the starting winding and the capacitor are effectively disconnected from the operating circuit of the motor as the motor approaches its normal operating speed. That is, the operating circuits of motors of this kind include switching devices which disconnect the starting winding and its associated capacitor from the line during normal or light load conditions, and connect the starting winding to the line only when the motor is started or under excessive load conditions. Capacitor-start motors of the conventional kind, however, are not satisfactory in many applications in which the motor is started quite frequently or in which the motor may be subjected to heavy load conditions which may cause it to draw heavy current and to operate at low speeds.

As thus far known in the art, electrolytic capacitors are not suited for use in another type of capacitor motor, sometimes referred to as a capacitor-start capacitor-run motor. Conventionally, a motor of this kind includes two windings which are displaced from each other, one of which is connected to a suitable capacitor for modifying the phase angle of the current therein so that the two windings draw currents which are displaced from each other by a phase angle of approximately 60° to 90°. In a motor of this kind, the capacitor is not disconnected from the circuit after the motor has been started, but rather remains connected in the operating circuit of the motor at all times. In some known motor circuit arrangements of this kind, two capacitors are employed. One of these is usually an electrolytic capacitor which is disconnected from the operating circuit as the motor approaches normal load conditions, whereas the other remains connected in circuit with one of the motor windings. In any event, the capacitor which remains continuously connected in the motor circuit must be of the continuous-duty type and consequently usually comprises an oil impregnated paper-type condenser. The continuous-duty condensers employed in these motors are relatively expensive and bulky, and add materially to the cost and size of the motor. At the same time, if an electrolytic capacitor is employed, in known circuit arrangements, for starting duty, it may be subject to failure if the motor is repeatedly started or if operating conditions cause relatively heavy loading of the motor at frequent intervals.

A principal object of the invention, therefore, is to utilize electrolytic capacitors in a new and improved control circuit for single-phase motors which effectively eliminates or minimizes the above-noted disadvantages and difficulties associated with previously known capacitor-type circuits, including both capacitor-start and capacitor-start capacitor-run arrangements. In the specification, and in the appended claims, the terms "capacitor-type operation" and "capacitor-type motor" are defined as including both capacitor-start and capacitor-start capacitor-run modes of operation.

A more specific object of the invention is to utilize electrolytic or other intermittent-duty capacitors, in the operating circuit of a capacitor-type motor, to produce uniform high starting torque, relatively high pull-in or break-down torques, and high motor running torque, and at the same time to reduce the danger of break-down of the capacitors under adverse load conditions.

Another object of the invention is to utilize a single-pole single-throw switching device to connect low cost intermittent-duty electrolytic capacitors in a control circuit for single-phase capacitor-type operation of a motor to reduce the cost of the motor and its control circuit and at the same time to increase the normal operating life of the motor and control devices, including the capacitors.

A further object of the invention is to reduce the voltage applied to intermittent-duty capacitors, in a control circuit for single-phase capacitor-type operation of a motor, while at the same time taking advantage of the maximum capacitance rating of the capacitors.

Another object of the invention is to provide a new and improved motor and control circuit construction which permits the use of low cost intermittent-duy electrolytic capacitors in applications which may require frequent starting of the motor and in which the motor may be subject to relatively heavy loads.

Still another object of the invention is to utilize low cost intermittent-duty capacitors to incorporate a relatively large capacitance in a motor circuit to neutralize the lagging current normally drawn by the motor and thereby increase the horsepower output and the efficiency, and to improve the power factor of the motor and thus reduce its operating cost.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a schematic diagram of a single-phase dual-voltage capacitor-start motor and control circuit constructed in accordance with one embodiment of the invention;

FIG. 2 is a schematic diagram of a dual-voltage capacitor-start motor and control circuit constructed in accordance with another embodiment of the invention;

FIG. 3 is a schematic diagram of a control circuit for single-phase capacitor-type operation of an induction motor, and is constructed in accordance with a third embodiment of the invention;

FIG. 4 is a schematic diagram of a capacitor-start capacitor-run control circuit for an induction motor and comprises another embodiment of the invention;

FIG. 5 is a schematic diagram showing a modification of the invention for operating a conventional three-phase motor as a capacitor-start motor in a single-phase circuit; and FIG. 6 illustrates another embodiment of the invention, similar to FIG. 5, for use in conjunction with a three-phase motor operated as a single-phase device.

FIG. 1 illustrates, in schematic form, a motor and control circuit for single-phase capacitor-start operation which comprises one embodiment of the invention. The device 10 shown therein comprises a motor armature 11 which may be of conventional wound rotor construction and may, for example, comprise a conventional squirrel-cage rotor for an induction motor. The particular construction employed for the rotor, which may be a high or low resistance type, is not critical to the present invention; for example, the armature may be constructed with individually wound wire coils mounted in slots in the usual laminated core structure, but it may equally well comprise die cast conductors instead of the wire coils. The armature 11 is, of course, mounted on the usual motor shaft 12.

The motor apparatus 10 further includes a motor field winding, in this instance comprising a main winding 13 including two individual winding sections 14 and 15 which are equally distributed in the stator core to produce a uniform magnetic field. The winding sections 14 and 15 are shown connected for 230 volt operation, assuming the motor to be a 230/115 volt machine; however, since the motor device 10 is a dual-voltage device, the main winding 13 may be re-connected for 115 volt operation by connecting the winding sections 14 and 15 in parallel with each other instead of in series, as shown. The common terminal of the two windings is indicated by the reference numeral 16, and such a common terminal is available no matter which way the windings are connected. The main winding 13 is connected to a single-phase power supply, here represented by the generator 17, by conventional means comprising a double-pole single-throw motor starting switch 18. Of course, the operating circuit of the motor device 10 may include suitable overload protection. Moreover, the manual switch 18 may be replaced by a suitable electrically operated contactor or by any other conventional motor switching device.

A starting winding 21 is included in the motor device 10 and, in the embodiment of FIG. 1, comprises a pair of winding sections 22 and 23 which are equally distributed in the stator core to produce a uniform magnetic field. The two sections 22 and 23 of the auxiliary winding 21 are connected in series with each other and one end of the winding section 22 is connected to the main winding 13 at the common terminal 16 between the two main winding sections 14 and 15. The starting winding 21 may be substantially conventional in construction except for the provision of the center tap 24, which constitutes the common terminal of the two winding sections 22 and 23. That is, the winding 21 may be formed of smaller wire than the main winding 13 in accordance with conventional practice.

The motor and control device 10 further includes a pair of capacitors 25 and 26 which are connected in series with each other to afford a capacitor circuit having two end terminals and a center terminal. The terminal 24, which comprises the center tap on the starting winding, comprises one end terminal of the capacitor circuit, the other end terminal being indicated by the reference numeral 27 and the center terminal of the capacitor circuit 29 being indicated by the reference numeral 28. In the illustrated arrangement, the capacitor circuit is connected in parallel with the section 23 of the starting winding 21, thus forming a local loop circuit including the winding 23 and the capacitors 25 and 26.

Control circuit means are provided to connect the starting winding and the capacitor circuit of the device 10 back to the power supply 17. In the arrangement of FIG. 1, this control circuit means comprises the conductor 31, which connects the center terminal 28 of the capacitor circuit back to the power supply. The control circuit includes a single-pole single-throw switch 32 which is connected in series with the conductor 31 and thus is connected in series between the capacitor circuit 29 and the power supply 17. The switch 32 is a centrifugally operated device which is normally closed but which is opened, as by means of the schematically illustrated centrifugal mechanism 33, upon rotation of the motor shaft 12 at a predetermined speed. Usually, this speed is approximately seventy percent of the operating speed of the motor under normal load conditions.

To place the motor and control arrangement 10 in operation, the starting switch 18 is closed. Upon closing of the switch, the main winding 13 comprising the winding sections 14 and 15 is energized, drawing a lagging current. At the same time, however, the starting winding 21 is energized through a circuit including the main winding section 14, the terminal 16, the capacitor circuit terminal 28, the conductor 31, and the normally closed switch 32. The capacitors 25 and 26 cause this part of the circuit to draw a leading current, and the circuit parameters of the starting winding 21 and the two capacitors 25, 26 are preferably such that this leading current is approximately equal to and approximately 90° displaced in phase from the current drawn by the main winding. Accordingly, the power factor during starting is approximately one, or at least close to unity, and may even be leading. Furthermore, the starting torque is relatively high and the total starting current is relatively low.

When the motor is started, it functions in a manner similar to a two-phase motor and the armature 11 begins to rotate, causing the shaft 12 to rotate. As the initial inertia of the motor is overcome, the speed of rotation of the shaft 12 increases. When the shaft speed reaches a predetermined value, the mechanism 33 causes the switch 32 to open, thereby effectively disconnecting the starting winding 21 and the capacitor circuit 29 from the motor circuit.

Under motor running conditions, with the switch 32 open, the capacitors 25 and 26 are connected across section 23 of the starting winding 21 in a closed local loop. The winding section 23 is of course still inductively coupled to the rotor 11. As a consequence, a substantial voltage is induced in the winding section 23, and a circulating current flows in the local loop circuit. This current is a leading current, and serves effectively to neutralize a substantial portion of the lagging current in the main winding sections 14 and 15. Accordingly, the motor efficiency is increased, the power factor is improved, and the motor output is increased. In fact, the power factor may be made approximately unity. Thus, although the starting winding and the capacitor circuit are disconnected from the power supply, the motor device 10 operates, under running conditions, in a manner analogous to a capacitor-run motor by virtue of the circulating current in the loop circuit comprising the capacitors 25 and 26 and the winding section 23.

The circuit arrangement of FIG. 1 permits the use of intermittent-duty capacitors, such as electrolytic capacitors, in motors which are started at frequent intervals or which may be subject to heavy load conditions which would slow the motor down and permit the switch 32 to close for extended periods of time. The voltage across the capacitors 25 and 26 is relatively low, as compared with line voltage. Consequently, even if relatively low-rated capacitors, such as 110 volt capacitors, are employed, there is little danger that they will be damaged if the starting winding 21 and the capacitor circuit 29 are kept connected to the motor for extended periods of time. Furthermore, by using low voltage intermittent-duty capacitors, a relatively high capacitance may be incorporated in the circuit of the starting winding without excessive cost. In the illustrated arrangement, with the capacitors connected across only one-half of the starting winding 21, the voltage applied to the capacitors is of the order of twenty-five percent of their normal voltage ratings, under running conditions, which affords a very substantial safety factor for the capacitors.

FIG. 2 illustrates another motor device and control circuit 40 which is substantially similar to the device 10 of FIG. 1. Thus, the device 40 comprises a conventional squirrel-cage rotor or armature 11, mounted upon a shaft 12, and associated with a main winding 13 comprising two sections 14 and 15. The main winding 13, as before, is connected to a single-phase power supply 17 by means of a suitable starting switch 18. As before, the common terminal of the main winding sections 14 and 15 is indicated by the reference numeral 16 and the main winding is arranged for dual-voltage connection, being shown connected for high voltage operation.

The motor apparatus 40 of FIG. 2 further includes a starting winding 41 including three winding sections 42, 43, and 44 which are connected in series with each other. The first winding section 42 is constructed to have a turns ratio of unity with respect to the two remaining windings 43 and 44 in the starting winding. That is, the first part 42 of the starting winding is constructed with the turns therein equal to the turns of the two other sections 43 and 44, and the sections 43 and 44 are made equal to each other.

The motor apparatus 40 also includes a pair of intermittent-duty electrolytic capacitors 45 and 46 which are connected in series with each other to afford a capacitor circuit 49 having a center terminal 48 and two end terminals 47 and 51. The capacitor circuit 49, comprising the capacitors 45 and 46, is connected in parallel with the series combination of the two winding sections 43 and 44 to form a local loop circuit. In addition, a third capacitor 52 is included in the capacitor circuit 49 and is connected across the terminal 48 and the intermediate terminal 53 between the two winding sections 43 and 44.

The control circuit for the motor apparatus 40 is somewhat different from that of the motor apparatus 10 (FIG. 1) and comprises a relay 54 of a current-sensitive type having an operating coil 55 which is connected in series with the main winding 13 of the motor. The relay 54 comprises a single-pole single-throw switch device having a pair of normally open contacts 56. The return circuit for the starting winding 41 of the motor comprises a conductor 57 which connects the center terminal 48 of the capacitor circuit 49 back to the power supply 17, the normally open relay contacts 54 being connected in series in this circuit.

Operation of the embodiment of FIG. 2 is substantially similar to that of FIG. 1. Thus, when the switch 18 is closed, both the main winding 13 and the starting winding 41 are energized. When the motor is started, the current drawn by the main winding is relatively high and the relay 54 is energized, closing the contacts 56 and effectively connecting the starting winding in the operating circuit of the motor.

When the initial inertia of the motor has been overcome, and the effective load is thus reduced, the current through the main winding 13 and the relay coil 55 is substantially lowered. As the current approaches normal operating current of the motor, the relay 54 is actuated to open the contacts 56. That is, the relay is adjusted to hold contacts 56 closed so long as a relatively high load current is drawn by the main winding of the motor. Of course, when the contacts 56 open, the starting winding 41 and the capacitor circuit 49 are effectively disconnected from the operating circuit of the motor and remain disconnected during operating under normal load conditions. In the event that the motor is loaded substantially beyond normal, or if the motor is stopped and again started, the high currents drawn by the main winding circuit are effective to close the relay contacts 56 and again connect the starting winding 41 and the capacitor circuit 49 in the operation circuit of the motor.

The use of the third capacitor 52, in the circuit arrangement of FIG. 2, increases the starting torque of the motor and develops a relatively high leading line current during starting or under excessive load conditions. These characteristics are quite desirable in some applications, particularly if the motor starts under substantial load. The starting torque is proportional to the capacitance of the third capacitor 52, to a substantial extent, and the line current, when the starting winding is connected in the motor circuit, is correspondingly higher than in the arrangement of FIG. 1.

Under motor running conditions, with the switching contacts 56 open, a substantial circulating current flows in the closed loop circuit comprising the capacitors 45 and 46 and the sections 43 and 44 of the starting winding 41, by virtue of the voltage induced in the starting winding through its inductive coupling to the rotor 11. This is a leading current and, as before, is effective to neutralize at least a portion of the normal lagging current of the motor, materially increasing the motor output and efficiency and, of course, improving the power factor. Since the closed loop is essentially a balanced bridge circuit, there is no significant voltage across the capacitor 52 and no appreciable current flows through this capacitor under normal running conditions.

To afford a more specific example of the invention, and to demonstrate more fully the operating characteristics and conditions in a given instance, certain circuit data are set forth for a conventional one-horsepower squirrel-cage motor of the dual voltage (115/230) type, having a rated speed of 1710 r.p.m. and a current rating of 14.4/7.2 amperes. It should be understood that these data are provided merely by way of illustration and in no sense as a limitation on the invention.

OPERATING VOLTAGES (VOLTS)

|  | Start | Full Load | No Load |
| --- | --- | --- | --- |
| Winding section 42 | 48 | 58 | 60 |
| Winding section 43 | 20 | 30 | 32 |
| Winding section 44 | 15 | 30 | 32 |
| Capacitor 45 [1] | 92 | 30 | 32 |
| Capacitor 46 [1] | 110 | 30 | 32 |
| Capacitor 52 [1] | 110 | 0 | 0 |

OPERATING CURRENTS (AMPERES)

|  |  |  |  |
| --- | --- | --- | --- |
| Line 57 | 28 | 0 | 0 |
| Capacitor 45 | 8 | 2.8 | 3.2 |
| Capacitor 46 | 10 | 2.8 | 3.2 |
| From Source 17 | 33 | 6.2 | 4.0 |

[1] Capacitors 45, 46, 52—125 volt, 270–300 mfd.

FIG. 3 illustrates another motor apparatus 60 which in many respects is similar in the embodiments of FIGS. 1 and 2, but which is modified as compared with the devices 10 and 40 shown therein. The motor and control arrangement 60 comprises a conventional squirrel-cage rotor or other induction motor armature 11 mounted upon an operating shaft 12 and associated with a main winding 13 which comprises two winding sections 14 and 15. The main winding 13 of the device 60 is connected, as before, to a single-phase supply 17 by suitable switching means such as the switch 18. The common terminal of the two winding sections 14 and 15 is again indicated by the reference numeral 16.

In this embodiment of the invention, the motor is provided with an auxiliary or starting winding 61 across which a capacitor circuit 62 is connected. The capacitor circuit 62 comprises a pair of capacitors 65 and 66 of the intermittent-duty electrolytic type, the two capacitors being connected in series with each other to form a capacitor circuit having two end terminals 64 and 67 and a center terminal 68. Moreover, the capacitor circuit 62 is connected in parallel with the starting winding 61 in a local loop circuit. The return circuit for the starting winding 61 and the capacitor circuit 62, in the arrangement illustrated in FIG. 3, comprises a conductor 71 which connects the center terminal 68 of the capacitor circuit 62 back to the power supply 17. This control circuit further includes, in series therewith, a pair of normally closed contacts 73 in a voltage-sensitive relay 74. The operating coil 75 of the relay 74 is connected across the starting winding 61, so that the relay is made sensitive of the operating voltage of the starting winding.

In operation, the motor apparatus 60 functions in a manner much like the previously described embodiments. When the starting switch 18 is closed, the main winding 13 is energized and the starting winding 61 is also energized through the operating circuit comprising the capacitor circuit 62, the conductor 71, and the normally closed contacts 73 of the relay 74. At the time the motor is started, the voltage across the starting winding 61 is relatively low, so that the voltage-sensitive relay 74 is not actuated and the contacts 73 remain closed.

As the motor picks up speed the voltage across the winding 61 increases. At some predetermined voltage level, corresponding to load conditions somewhat below rated full speed for the motor, the voltage across the starting winding becomes high enough to actuate the relay 74. As a consequence, the contacts 73 open, disconnecting the starting winding 61 and the capacitor circuit 62 from the operating circuit of the motor. As in the case of the previously described embodiments, under motor running conditions, the voltages applied to the capacitors 65 and 66 are relatively low, with the result that intermittent-duty capacitors may be employed even though the motor may be subjected to frequent starting and may on occasion be operated under heavy load conditions such that the motor draws excessive current and maintains the starting winding 61 and the capacitor circuit 62 connected in the motor circuit for substantial periods of time.

FIG. 4 illustrates another embodiment of the invention which in some respects is substantially similar to those described hereinabove but which operates as a capacitor-start capacitor-run motor energized directly from the supply line rather than a capacitor-start and run device with the starting circuit inductively energized under running conditions. Thus, the motor and control apparatus 80 illustrated in FIG. 4 may comprise a conventional squirrel-cage rotor 11 mounted upon an operating shaft 12 and associated with a main winding 13 comprising a first winding section 14 and a second winding section 15 connected together at a common terminal 16. The motor winding 13 is connected to a single-phase power supply 17 through a suitable motor starting device such as the switch 18.

The operating circuit of the motor apparatus 80 further includes a pair of intermittent-duty electrolytic capacitors 81 and 82 which are connected in series with each other to afford a capacitor circuit 83 having two end terminals 84 and 85 and a center terminal 86. One end terminal 84 of the capacitor circuit is connected to the center terminal 16 of the main winding 13. The other end terminal 85 of the capacitor circuit is connected back to the power supply. A starting winding 87 is connected to the center terminal 86 of the capacitor circuit and is returned to the power supply through a circuit including a differential relay 88 having a pair of operating coils 91 and 92 and a pair of normally open contacts 93. The one operating coil 91 of the relay is connected in series with the return circuit for the main winding section 15.

When the motor starting switch 18 is closed, in the embodiment of FIG. 4, the main winding 14 and 15 is energized. Moreover, the current through the relay coil 91 is relatively high and is effective to close the relay contacts 93. Thus, the starting winding 87 is energized through a circuit comprising the center terminal 16 on the main winding, the capacitor 81, and the relay contacts 93 and is also energized through a separate series circuit comprising the capacitor 82. During this phase of operation of the motor apparatus 80, the voltage across the capacitors 81 and 82 is relatively high, since the two capacitors are effectively connected in parallel with the main winding section 14 in a local loop. As the motor approaches its normal operating speed, the differential vector sum of currents drawn by the two relay coils 91 and 92 is reduced substantially and, when the current reaches a predetermined value, the relay contacts 93 open. As a consequence, the starting winding 87 is effectively disconnected from the operating circuit of the motor. Capacitors 81 and 82, however, are not disconnected from the circuit, since they remain connected in parallel with the one section 14 of the main winding 13. Thus, the motor continues to function as a directly energized capacitor-run device. The line current may be at unity power factor, under running conditions, or at a leading power factor, by virtue of the capacitors 81 and 82 connected in series with each other and in parallel with winding section 14. The ratings of the capacitors 81 and 82 may be selected to afford a relatively high starting torque at low line current. On the other hand, the circuit parameters may be selected to provide extremely high starting torque, at relatively high leading starting current, for applications where high torque is required for starting and running duty, as in hoists and similar applications. In either case, the two main winding sections 14 and 15 may be made equal in turn ratio or may be constructed somewhat differently from each other. Thus, it is usually desirable to use a somewhat larger wire size in the coils of the first winding section 14 to compensate for the presence of the capacitors in this part of the motor circuit and to reduce the overall temperature rise of the motor. It should be understood that the motor of FIG. 4 is a single-voltage device and that the voltage rating of the capacitors should be selected to correspond to the operating voltage of the motor. On the other hand, the voltage impressed upon the capacitors 81 and 82, during both starting and running conditions, is less than or equals the line voltage and is substantially less or about twenty-five percent to thirty-three percent of their voltage rating, affording a substantial safety factor with respect to the capacitors and permitting their use as continuous-duty devices.

In each of the embodiments described hereinabove in connection with FIGS. 1-4, a different switching device has been shown. Thus, the switch 32 in FIG. 1 is centrifugally operated and is directly responsive to the speed of the motor shaft 12. The relay 54 in the embodiment of FIG. 2 is controlled by the line current of the motor apparatus 40, whereas the relay 74 in the embodiment of FIG. 3 is actuated in accordance with the voltage across the starting winding 61 of the motor. In FIG. 4, a current-sensitive relay is again employed, but in this case the relay is responsive to a combination of the currents drawn by the main and starting windings. However, despite the substantial differences, they are all essentially similar in that each comprise a single-pole single-throw switching device having contacts which are maintained closed during excessive load conditions, as when the motor is started or is subjected to excessive torque demands. Moreover, in each instance, the switch contact automatically opens and remains open under normal or relatively light load conditions in operation of the motor. Thus, each of the circuits is effectively controlled by a single relatively simple and inexpensive switch or relay, substantially reducing the cost of the control circuit as compared with more complex switching arrangements.

The invention may also be utilized in the operation of three-phase motors from a single-phase source. One arrangement of this kind is shown in FIG. 5, which illustrates a motor apparatus 100 comprising a conventional induction type armature or a squirrel-cage rotor 101 mounted upon an operating shaft 102. The motor 100 further includes a conventional three-phase field winding 103 comprising three winding sections 104, 105 and 106 connected to each other at a common terminal 107, known as a star connection. As thus far described, it will be recognized that the motor is substantially conventional in construction and corresponds to devices normally employed in conjunction with a three-phase power supply.

In the circuit arrangement of FIG. 5, however, the motor apparatus 100 is connected in a circuit which permits operation from a single-phase power supply 108. The illustrated control circuit provides for connection of the two winding sections 104 and 106, in series with each other, across the power supply 108. A manually operated or other starting switch 109 is included in the circuit of the two winding sections 104 and 106. Thus, the two winding sections 104 and 106 comprise the main winding of the motor, operating as a single-phase device, as described more fully hereinafter.

The control circuit of FIG. 5 further includes a pair of capacitors 111 and 112 of the intermittent-duty electrolytic type which are connected in series with each other to form a capacitor circuit 113 having two end terminals 114 and 115 and a center terminal 116. One end terminal 114 of the capacitor circuit is connected to the third winding section 105 and the other end terminal of the capacitor circuit is connected to the common terminal 107 of the motor winding. In addition, the center terminal 116 of the capacitor circuit is connected back to the power supply 108 through a pair of normally open contacts 118 of a relay 119, the operating coil 121 of the relay being connected in series with main winding section 104. Thus, the capacitor circuit 113 is connected in series-parallel relation with the winding section 105, which is employed as a starting winding in operation of the motor.

When the motor apparatus 100 of FIG. 5 is to be placed in operation, the switch 109 is closed, energizing the two windings 104 and 106. The current drawn by these windings is relatively high and is effective to actuate the relay 119, closing the contacts 118. Accordingly, the series combination of the capacitor 111 and the coil 105 is effectively connected in the motor circuit in parallel with the winding section 104 and the capacitor 112 is also connected in the circuit in parallel relation to the two windings 104 and 105. The phase angles of the currents drawn by the three winding sections 104, 105 and 106 are each effectively different from each other, due to the presence of the capacitors 111 and 112 in the starting circuit of the motor. Consequently, the armature or a rotor 101 starts to rotate, in a manner analogous to starting of a capacitor-start motor of the kind described hereinabove in connection with FIGS. 1-3.

As the rotational speed of the armature 101 increases, and the initial inertia of the motor is overcome, the current in the field windings of the motor reduces substantially. Accordingly, the current through the coil 121 also decreases. The relay 119 is adjusted to open the contacts 118 at a predetermined current corresponding to a rotational speed somewhat below the normal rated speed of the motor. When this occurs, both the winding section 105 and the capacitor 113 are effectively disconnected from the operating circuit of the motor. Thereafter, the motor continues to operate in substantially the same manner as the single-phase motors described hereinabove in connection with FIGS. 1-3.

With the illustrated circuit, the capacitors 111 and 112 are operated near their rated voltage on starting, but at only about twenty-five percent rated voltage under running conditions. Consequently, the capacitors are able to withstand frequent starts and also are capable of relatively long life even though subjected frequently to excessive load conditions. Moreover, the single-pole switching arrangement affords an economical yet highly effective means for converting a three-phase motor for operation from a single-phase supply.

The control for the switching device 119 in FIG. 5 is, of course, substantially the same as for the corresponding relay 54 in FIG. 2. However, any of the other switching arrangements shown in FIGS. 1-4 may be employed if desired. For example, a centrifugal switch such as the switch 32 of FIG. 1 may be utilized in the circuit of FIG. 5 instead of the relay 119, or a dual-current sensitive relay such as the relay 88 (FIG. 4) may be incorporated in the circuit of FIG. 5 with equal facility. Moreover, a voltage-sensitive device such as the relay 74 (FIG. 3) may be connected across the winding section 105 to afford the necessary control function.

FIG. 6 illustrates another embodiment of the invention which in many respects is similar to that of FIG. 5, the motor apparatus 130 comprising a three-phase motor connected in a circuit for operation from a single phase power supply 108. Thus, the motor apparatus 130 may comprise a conventional induction-type rotor 101 mounted upon a shaft 102 and inductively coupled to a conventional three-phase field winding 103 comprising the winding sections 104, 105 and 106. The windings are star-connected at a common terminal 107. As before, the two winding sections 104 and 106 are connected in series with each other across the power supply 108, a starting switch 109 being included in the circuit.

The control circuit of FIG. 6 also includes the two capacitors 111 and 112 which are connected in series with each other to form the capacitor circuit 113 having two end terminals 114 and 115 and a central terminal 116. As before, the terminal 114 is connected to one end of the winding 105, and the terminal 115 is connected back to the center terminal 107 of the three-phase winding.

In this instance, however, the central terminal 116 of the capacitor circuit is connected back to the power supply 108 through a pair of normally open contacts 131 of a relay 132. The operating coil 123 of the relay 132 is connected between the power supply terminal 124 and the center terminal 107 of the field winding. The circuit includes, in series with the coil 123, a pair of normally closed contacts 125 of a relay 126. The operating coil 127 of the relay 126 is connected between the two terminals 107 and 114. In addition, a further capacitor 133 is included in the circuit of the device 120 and is connected in parallel with the field coil 104.

In the described arrangement, the relay 126 is a voltage-sensitive device of the kind frequently employed as a motor starting relay. The relay 132, on the other hand, may comprise a standard single-pole, single-throw relay.

When the motor apparatus 130 of FIG. 6 is placed in operation, the switch 109 is closed, directly energizing the two windings 104 and 106. The in-rush current is relatively high and the voltage across the coil 123 of the relay 132, accordingly, is relatively high. Consequently, the contacts 131 are closed, when the motor is started, with the result that the series combination of the capacitor 111 and the coil 105 is effectively connected in parallel with the winding section 104. Moreover, the capacitor 112 is also connected in the circuit in parallel with the two windings 104 and 105.

Subquently, as the rotational speed of the rotor 101 increases, the current drawn by the motor is reduced substantially. Moreover, the potential across the coil 105 builds up, as the motor approaches normal speed, with the result that the relay 126 is actuated, opening the contacts 125 and disconnecting the opening coil 123 of the relay 132 from its energizing circuit. The combination of the two relays 132 and 126 thus operates in substantially the same manner as the relay 119 of FIG. 5, the two relays being somewhat more efficient in operation in that any tendency toward chattering or intermittent opening and closing of the relay 132 is eliminated.

The additional capacitor 133 in the circuit arrangement of FIG. 6 is not disconnected from the circuit when the motor reaches rated speed. Instead, this capacitor remains in circuit at all times. Thus, in addition to the power factor correction afforded by the capacitor circuit 113, as described hereinabove, in connection with FIG. 5, the capacitor 133 provides a further and continuing correction for the power factor of the motor. The leading current provided by the capacitor circuit 113 and the additional capacitor 133 effectively neutralizes the lagging current of the field windings 104 and 106 with the result that the efficiency of the motor is substantially improved and the motor output is increased. The motor device 130 may be constructed to operate the unitary power factor or even with a leading power factor. Preferably, an electrolytic capacitor is used for the capacitor 133, in which case a relatively high voltage capacitor should be selected to provide an adequate safety factor, since that capacitor is continuously connected in the circuit. For a motor operated on a 115 volt line, the voltage rating of the capacitor 133 should be 500 or 600 volts.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A control circuit for single-phase capacitor-type operation of a motor including a main winding and a starting winding angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said two end terminals of said capacitor circuit to one of said windings to connect said capacitor circuit in parallel with at least a part of said one winding in a local loop, said circuit means further affording a circuit coupling one end of said one winding to said power supply; control circuit means connecting the center terminal of said capacitor circuit back to said power supply, said control circuit means constituting the only return circuit for said starting winding and including a single-pole single-throw switching device in series therewith; and means for maintaining said switching device in closed condition during starting and other excessive load conditions in operation of said motor to apply a predetermined initial voltage across each of said capacitors, and for opening said switching device during normal load conditions, the voltage across said capacitors under normal load conditions being of the order of 25 percent of said initial voltage when said switching device is open.

2. A control circuit for single-phase capacitor-type operation of a motor having a main winding and a starting winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said two end terminals of said capacitor circuit to said starting winding to connect said capacitor circuit in parallel with at least a part of said starting winding in a local loop circuit, said circuit means further affording a circuit coupling one end of said starting winding to said power supply; a control circuit connecting the center terminal of said capacitor circuit back to said power supply, and affording the only return circuit between said starting winding and said power supply, said return circuit including a single-pole single-throw switching device in series therewith; and means for maintaining said switching device in closed condition during excessive load conditions in operation of said motor and for opening said switching device during normal load conditions.

3. A control circuit for single-phase capacitor-type operation of a motor having a main winding, comprising two sections connected to each other at a common terminal, and a starting winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a central terminal; circuit means connecting said two end terminals of said capacitor circuit to said starting winding to connect said capacitor circuit in parallel with at least a part of said starting winding to form a closed local loop circuit, and circuit means further affording a circuit coupling one end of said starting winding to said common terminal of said main winding sections; a control circuit connecting the center terminal of said capacitor circuit back to said power supply, said control circuit constituting the only return circuit connecting said starting winding back to said power supply and including a single-pole single-throw switching device in series therewith; and means for maintaining said switching device in closed condition during excessive load conditions in operation of said motor and for opening said switching device during normal load conditions.

4. A control circuit for single-phase capacitor-type operation of a motor having a main winding and a starting winding each comprising two sections connected to each other at a center terminal, one end of said starting winding being connected to the center terminal of said main winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said end terminals of said capacitor circuit to said starting winding to connect said capacitor circuit in parallel with one section of said starting winding; a return circuit for said starting winding, connecting said center terminal of said capacitor circuit to said power supply, and including a single-pole single-throw switching device in series therewith; and means for maintaining said switching device in closed condition during excessive load conditions in operation of said motor and for opening said switching device during normal load conditions.

5. A control circuit for single-phase capacitor-type operation of a motor having a main winding and a starting winding each comprising two sections connected to each other at a center terminal, one end of said starting winding being connected to the center terminal of said main winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said end terminals of said capacitor circuit to said starting winding to connect said capacitor circuit in parallel with one section of said starting winding; a third capacitor, connected between said center terminal of said capacitor circuit and a center tap on said one section of said starting winding; a return circuit for said starting winding, connecting said center terminal of said capacitor circuit to said power supply, and including a single-pole single-throw switching device in series therewith; and means for maintaining said switching device in closed condition during excessive load conditions in operation of said motor and for opening said switching device during normal load conditions.

6. A control circuit for single-phase capacitor-type operation of a motor having a main winding and a starting winding each comprising two sections connected to each other at a center terminal, one end of said starting winding being connected to the center terminal of said main winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said end terminals of said capacitor circuit to said starting winding to connect said capacitor circuit in parallel with one section of said starting winding; a third capacitor, connected between said center terminal of said capacitor circuit and a center tap on said one section of said starting winding; a return circuit for said starting winding, connecting said center terminal of said capacitor circuit to said power supply, and including a single-pole single-throw switching device in series therewith; and means for maintaining said switching device in closed condition during starting and other excessive load conditions in operation of said motor to apply a predetermined initial voltage across each of said capacitors no greater than their rated voltages, and for opening said switching device during normal load conditions, the voltages across said first two capacitors being of the order of 25 percent of their rated voltage and the voltage across said third capacitor being negligible when said switching device is open.

7. A control circuit for single-phase capacitor-type operation of a motor having a main winding, comprising two sections connected to each other at a center terminal, and a starting winding, one end of said starting winding being connected to the center terminal of said main winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said end terminals of said capacitor circuit to said starting winding to connect said capacitor circuit in parallel with said starting winding; a return circuit for said starting winding, connecting said center terminal of said capacitor circuit to said power supply, said return circuit constituting the only return circuit for said starting winding and including a single-pole single-throw switching device in series therewith; and means for maintaining said switching device in closed condition during excessive load conditions in operation of said motor and for opening said switching device during normal load conditions.

8. A control circuit for single-phase capacitor-type operation of a three-phase motor having a field winding comprising three-star-connected sections connected to each other at a common center terminal and inductively coupled to a rotor, comprising: means for connecting two sections of said winding to a single-phase power supply; a pair of intermittent-duty capacitors connected in series with each other to afford a capacitor circuit having two end terminals and a center terminal; circuit means connecting said end terminals of said capacitor circuit to the third section of said winding to connect said capacitor circuit in series with said third section of said winding in a local loop; a return circuit for said third section of said winding, connecting said center terminal of said capacitor circuit to said power supply, said return circuit constituting the only return circuit for said starting winding and including a single-pole single-throw switching device connected in series therewith; and means for maintaining said switching device in closed condition during excessive load conditions in operation of said motor and for opening said switching device during normal load conditions.

9. A control circuit for single-phase capacitor-type operation of a three-phase motor having a field winding comprising three star-connected sections connected to each other at a center terminal and inductively coupled to a rotor, comprising: means for connecting two sections of said winding to a single-phase power supply; a pair of intermittent-duty capacitors connected in series with each other to afford a capacitor circuit having two end terminals and a center terminal; circuit means connecting said end terminals of said capacitor circuit to the third section of said winding to connect said capacitor circuit in series with at least a part of said third section of said winding in a local loop; a return circuit for said third section of said winding, connecting said center terminal of said capacitor circuit to said power supply, said return circuit constituting the only return circuit for said starting winding and including a single set of relay contacts in series therewith; and means for maintaining said relay contacts in closed condition during excessive load conditions in operation of said motor and for opening said contacts during normal load conditions.

10. A control circuit for single-phase capacitor-start, capacitor-run operation of a motor having a main winding comprising two sections connected to each other at a center terminal, and a starting winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said end terminals of said capacitor circuit to said main winding to connect said capacitor circuit in parallel with one section of said main winding; an operating circuit for said starting winding, connecting said starting winding in series with said center terminal of said capacitor circuit and said power supply, and including a single-pole single-throw switching device in series therewith; and means for maintaining said switching device in closed condition during excessive load conditions in operation of said motor and for opening said switching device during normal load conditions, the voltage across said capacitors under normal load conditions being of the order of twenty-five percent of said initial voltage when said switching device is open.

11. A control circuit for single-phase capacitor-type operation of a motor including a main winding, comprising two sections, and a starting winding, said windings being angularly displaced from each other in a stator core and inductively coupled to a rotor, comprising: means for connecting said main winding to a single-phase power supply; a pair of intermittent-duty capacitors connected in series with each other to afford a capacitor circuit having two end terminals and a center terminal; circuit means connecting said two end terminals of said capacitor circuit to said starting winding to connect said capacitor circuit in parallel with at least a part of said starting winding in a local loop, said circuit means further affording a circuit coupling one end of said starting winding to said power supply through one section of said main winding; control circuit means connecting the center terminal of said capacitor circuit back to said power supply, said control circuit means affording the only return circuit for said starting winding and including a single-pole single-throw switching device in series therewith; and means for maintaining said switching device in closed condition during starting and other excessive load conditions in operation of said motor to apply a predetermined initial voltage across each of said capacitors, and for opening said switching device during normal load conditions, the voltage across said capacitors under normal load conditions being of the order of 25 percent of said initial voltage when said switching device is open.

References Cited in the file of this patent

UNITED STATES PATENTS

| | | |
|---|---|---|
| 2,028,230 | Lyden | Jan. 21, 1936 |
| 2,033,047 | Morrill | Mar. 3, 1936 |
| 2,464,756 | Trickey | Mar. 15, 1949 |

FOREIGN PATENTS

| | | |
|---|---|---|
| 451,099 | Great Britain | July 29, 1936 |
| 513,635 | Great Britain | Oct. 18, 1939 |